(12) United States Patent
Li et al.

(10) Patent No.: US 9,227,272 B2
(45) Date of Patent: Jan. 5, 2016

(54) NANOCOMPOSITE WELDING WIRES

(71) Applicants: Wisconsin Alumni Research Foundation, Madison, WI (US); Eck Industries, Inc., Manitowoc, WI (US)

(72) Inventors: Xiaochun Li, Madison, WI (US); Hongseok Choi, Madison, WI (US); David Weiss, Manitowoc, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 407 days.

(21) Appl. No.: 13/739,425

(22) Filed: Jan. 11, 2013

(65) Prior Publication Data

US 2014/0197147 A1    Jul. 17, 2014

(51) Int. Cl.
| | |
|---|---|
| *B23K 9/00* | (2006.01) |
| *B23K 9/28* | (2006.01) |
| *B23K 15/00* | (2006.01) |
| *B23K 35/22* | (2006.01) |
| *B23K 35/24* | (2006.01) |
| *B23K 35/34* | (2006.01) |
| *B23K 35/00* | (2006.01) |
| *B23K 35/02* | (2006.01) |

(52) U.S. Cl.
CPC ............ *B23K 35/00* (2013.01); *B23K 35/0244* (2013.01); *B23K 35/0261* (2013.01)

(58) Field of Classification Search
CPC . B23K 35/00; B23K 35/0244; B23K 35/0261
USPC ................ 219/121.11, 121.13, 121.14, 136, 219/137.2, 145.1, 146.1, 146.31, 146.32
See application file for complete search history.

(56) References Cited

U.S. PATENT DOCUMENTS

2011/0194973 A1*   8/2011   Anderson ................. 420/534

OTHER PUBLICATIONS

Choi et al., Unusual Hot Tearing Resistance Enhancement in Cast A206/Al$_2$O$_3$ Nanocomposite; Conference abstract from Structural Materials for Aerospace and Defense: Challenges and Prospects Symposium at the Materials Science & Technology Conference (2011), Oct. 16-20, 2011.
Chawla et al., Mechanical Behavior of Particle Reinforced Metal Matrix Composites, Advanced Engineering Materials, vol. 3, No. 6, May 31, 2001, pp. 357-370.
DeCicco et al., Paper presented at TMS 2011, 140th Annual Meeting & Exhibition, Mar. 3, 2011.
DeCicco et al., Meeting abstract from TMS 2011, 140th Annual Meeting & Exhibition, published online Feb. 2, 2011.
T. E. Quested, Understanding mechanisms of grain refinement of aluminium alloys by inoculation, Materials Science and Technology, vol. 20, Nov. 2004, pp. 1357-1369.
Ramachandran et al., Grain Refinement of Light Alloys, Proceedings of 68th World Foundry Congress, Feb. 7-10, 2008, Chennai, India, pp. 189-193.
Shepelev et al., Grain refinement and mechanical properties enhancement of AZ91E alloy by addition of ceramic particles, J. Mater. Sci., vol. 46, Apr. 20, 2011, pp. 5798-5806.

(Continued)

*Primary Examiner* — Dana Ross
*Assistant Examiner* — Lindsey C Teaters
(74) *Attorney, Agent, or Firm* — Bell & Manning, LLC

(57) ABSTRACT

Welding wires and methods for welding metal work pieces using the welding wires are provided. The welding wires are composite materials comprising a metal alloy and high temperature nanoparticles dispersed in the metal alloy.

24 Claims, 2 Drawing Sheets

(56) References Cited

OTHER PUBLICATIONS

Calik et al., Mechanical Properties of Boronized AISI 316, AISI 1040, AISI 1045 and AISI 4140 Steels, Acta Physica Polonica A, vol. 115, No. 3, 2009, pp. 694-698.

Eskin et al., Production of natural and synthesized aluminum-based composite materials with the aid of ultrasonic (cavitation) treatment of the melt, Ultrasonics Sonochemistry, vol. 10, Jul. 2003, pp. 297-301.

Fan et al., Semi-solid processing of engineering alloys by a twin-screw rheomoulding process, Materials Science and Engineering: A, vol. 299, 2001, pp. 210-217.

Yan et al., Review Durability of materials in molten aluminum alloys, Journal of Materials Science, vol. 36, 2001, pp. 285-295.

Freudig et al., Dispersion of powders in liquids in a stirred vessel, Chemical Engineering and Processing, vol. 38, Sep. 1999, pp. 525-532.

Tiryakioglu et al., On the ductility potential of cast Al-Cu-Mg (206) alloys, Materials Science and Engineering A, vol. 506, Apr. 25, 2009, pp. 23-26.

Zheng et al., Assessment of Thermodynamic Stability of Reinforcements in Aluminum Alloy Melts, High-Temperature Materials and Processes, vol. 22, No. 1, Feb. 2003, pp. 35-45.

Choi et al., Characterization of hot extruded Mg/SiC nanocomposites fabricated by casting, J. Mater. Sci., vol. 46, Jan. 6, 2011, pp. 2991-2997.

Choi, et al., "Nanoparticle-Induced Superior Hot Tearing Resistance of A206 Alloy," *Metallurgical and Materials Transactions A*, published online Nov. 10, 2012, vol. 44A, pp. 1897-1907.

\* cited by examiner

NANOCOMPOSITE WELDING WIRES

REFERENCE TO GOVERNMENT RIGHTS

This invention was made with government support under 70NANB10H003 awarded by the National Institute of Standards and Technology. The government has certain rights in the invention.

BACKGROUND

Advanced metal alloys with high strength and high fracture toughness are used in an increasing number of applications. However, the use of some metal alloys, including Al—Cu alloys, as critical structural components has been limited due to their poor weldability. The weldability of alloys depends upon their chemical composition and is generally defined qualitatively by investigating final weld quality. The extent of hot cracking defects in a weld is one measure of a material's weldability. Hot cracking is caused by solidification shrinkage and thermal contraction during weld cooling. Conventional approaches to reducing the hot cracking susceptibility of a weld have included changing the welding processing parameters (e.g., pre-heating, welding speed, etc.) or modifying the filler metal of the welding material. Unfortunately, these methods have met with limited success.

SUMMARY

Welding wires and methods for welding metal work pieces using the welding wires are provided.

The welding wires comprise a nanocomposite material comprising a metal alloy and a plurality of high temperature nanoparticles, such as ceramic or intermetallic nanoparticles, dispersed in the metal alloy, wherein the composite material is in an elongated form characterized by a length and a diameter, both of which are sized to render the elongated form suitable for use as a welding wire.

Methods for using the welding wires to weld a joint in metal work pieces include the steps of: melting at least a portion of the metal alloy of the work pieces in the proximity of an interface between the work pieces; melting at least a portion of a welding wire in the proximity of the interface, whereby a molten weld pool comprising molten metal alloy from the work pieces and molten metal alloy from the welding wire is formed; and allowing the molten weld pool to solidify, thereby forming a welded joint at the interface.

Other principal features and advantages of the invention will become apparent to those skilled in the art upon review of the following detailed description, and the appended claims.

DETAILED DESCRIPTION

Figure 1:
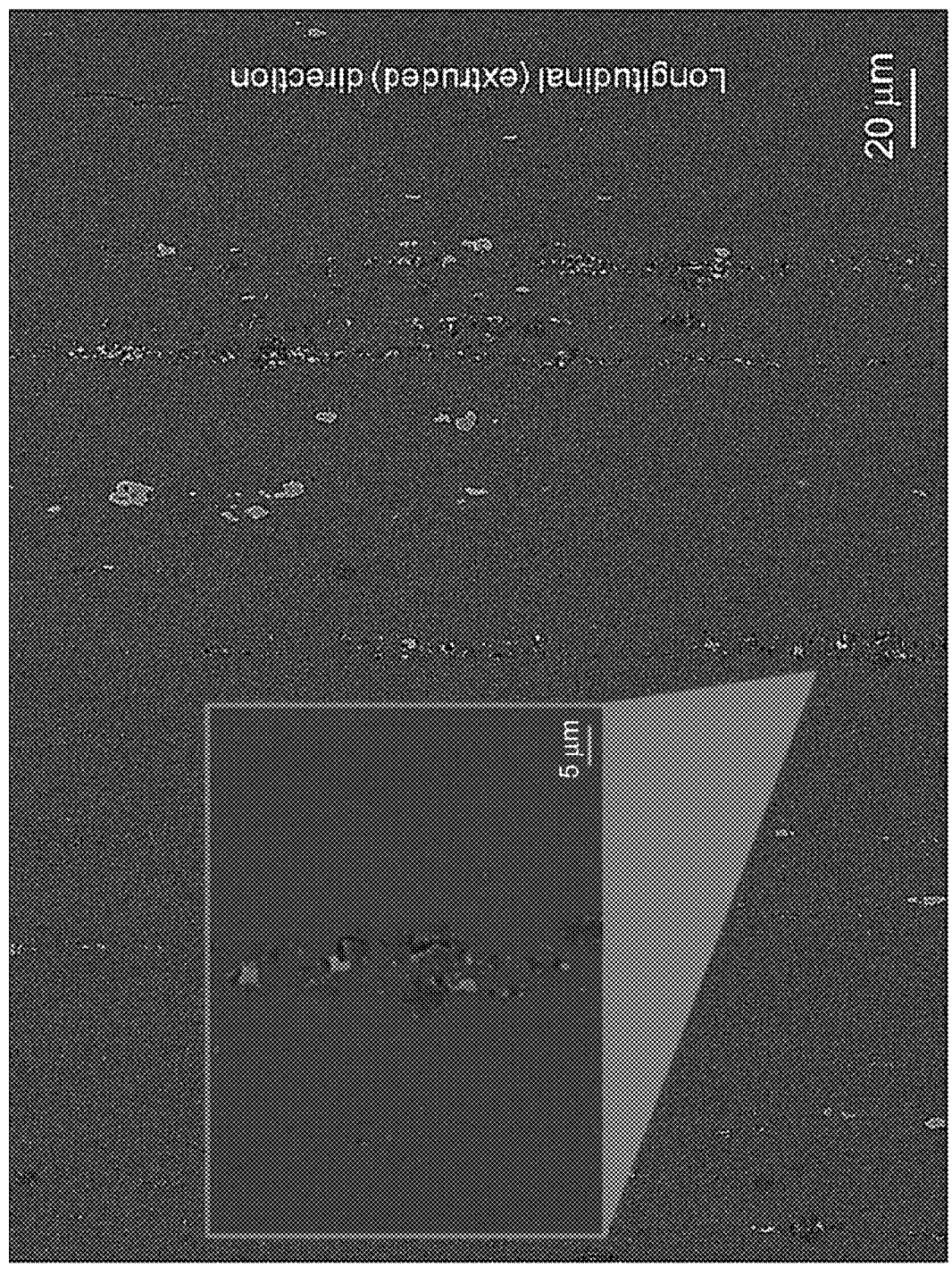
FIG. 1 is a scanning electron microscope image of a welding wire comprising $Al_2O_3$ nanoparticles dispersed in an A206 alloy matrix taken along the longitudinal (extruded) direction.

Welding wires and methods for welding metal work pieces using the welding wires are provided. The welding wires are composite materials comprising a metal alloy and high temperature nanoparticles dispersed in the metal alloy. Relative to welding wires lacking the dispersed high temperature nanoparticles, the present welding wires exhibit reduced weld hot cracking.

Without intending to be bound to any theory of the invention, the inventors believe that the advantages provided by the present welding wire can be attributed to the ability of the high temperature nanoparticles to act as a nucleating agent for grain refinement in the primary phase of the metal alloys and to modify the grain structure of the secondary phase of the metal alloy. It is proposed that this modified grain structure is the result of the formation of a thin nanoparticle film around the dispersed secondary phase in the alloy, wherein the nanoparticle film slows the growth of the secondary phase particles. The ability to modify the structure of the secondary phase can be made possible by using nanoparticles that are smaller than those used in conventional alloy grain refinement applications.

The welding wires can be made from a wide range of metal alloys. In fact, the improved properties of the composite materials make it possible to fabricate welding wires from metal alloys that were not previously utilized or that were underutilized in welding wire applications. In some embodiments, the welding wires are made from the same metal alloy as the work piece to be welded. This is advantageous because it reduces or eliminates the deterioration in the mechanical properties of the welds caused by impurities that are typically introduced when the filler metal (that is, the metal to be added in making a weld) differs from the base metal alloy of the work piece. In other embodiments, the welding wires are made from a different metal alloy as the work piece to be welded. For example, the alloys of the welding wire and the work pieces may have the same majority metal element, but different primary alloying elements. By way of illustration, in some embodiments, the metal alloys of the welding wire and the work pieces are aluminum alloy that differ in their primary alloying element. An example of such an embodiment is one in which one of the work piece or the welding wire comprises an Al—Cu alloy (e.g., A206) and the other of the work piece or the welding wire comprises an Al—Zn alloy (e.g., alloy 7075).

Aluminum alloys (that is, alloys in which the majority element is aluminum) are examples of alloys from which the composite material of the welding wires can be made. These alloys include aluminum-copper (Al—Cu) alloys, such as A206-type alloys, and Al—Zn alloys, such as 7075 alloys. Other examples include, but are not limited to, magnesium alloys, steels, Ni-based superalloys, and titanium alloys.

The high temperature nanoparticles dispersed in the metal alloy of the welding wire should be sufficiently small in size to form a thin film on the discrete secondary phase of the metal alloy. Thus, for the purposes of this disclosure, the term nanoparticle refers to a particle having a diameter of no greater than 300 nm. A typical nanoparticle in the nanocomposite material of the welding wires will have a diameter of no greater than about 250 nm and more typically, no greater than about 150 nm. Moreover, although nanoparticles having diameters at the larger end of the size range may be present, the distribution of nanoparticles in the welding wire composite material has a significantly lower average diameter. Thus, in some embodiments, the average diameter of the distribution of nanoparticles in the metal alloy material is no greater than about 250 nm. This includes embodiments in which the average diameter of the distribution of nanoparticles is no greater than about 200 nm, no greater than about 100 nm, or no greater than about 50 nm. For example, in some embodiments the average diameter for the nanoparticles in the distribution is in the range from about 10 to about 100 nm. The distribution of the high temperature particles is desirably free from, or substantially free from, particles of the high temperature material having a diameter greater than 300 nm.

The nanoparticles may have a wide range of morphologies. For example, the nanoparticles may be spherical or substantially spherical, elongated (e.g., nanorods or nanowires), disc-shaped, or sheet-shaped (e.g., in the form of thin flakes). For nanoparticles having a non-spherical shape, the diameter of the nanoparticle refers to the longest cross-sectional dimension of the nanoparticle.

The nanoparticles are composed of high temperature inorganic materials. As used herein, the phrase high temperature material refers to a material that remains a solid at the melting temperature of the metal alloy in which it is dispersed. Thus, the melting temperature of the high temperature materials can be, for example, at least 800° C., at least 1000° C., or at least 1500° C. The high temperature materials can be intermetallic compounds (i.e., compounds formed of two or more metals) and ceramics, including both oxide and non-oxide ceramics (e.g., carbides, nitrides, borides and silicides). Specific examples include TiCN, TiC, MgO, $TiO_2$, TiN, TiAl, TiSi, SiC, $TiB_2$, $ZrO_2$, and $Al_2O_3$.

The optimal choice of nanoparticle material will depend on the metal alloy of the welding wire nanocomposite. The nanoparticle material is desirably chosen such that the lattice matching between the nanoparticle material and the metal alloy of the composite is sufficient to allow the nanoparticles to act as nucleating agents for grain refinement. In addition the nanoparticle material is desirably chosen such that it has sufficient wettability in the metal alloy to allow for the formation of a thin nanoparticle film at the interface between the primary and secondary phases of the metal alloy. By way of illustration, an Al—Cu alloy, such as A206, and $Al_2O_3$ nanoparticles are an example of a metal alloy/nanoparticle pair that may be used as a composite welding wire material for welding Al—Cu alloy work pieces. By way of further illustration, an Mg—Zn alloy and SiC nanoparticles are another example of a metal alloy/nanoparticle pair that may be used as a composite welding wire material for Mg—Zn work pieces.

The concentration of nanoparticles in the metal alloy should be sufficient to reduce the hot cracking of the weld, but sufficiently low to avoid significant clustering of the nanoparticles in the composite. Also, with increasing nanoparticle loading, the composites will eventually reach a nanoparticle concentration beyond which no additional benefits are observed. Therefore, although an excess of nanoparticles can be used, any excess should be minimized to avoid unnecessary expense and/or a negative impact on weld performance. In some embodiments of the welding wires, the nanoparticles account for no greater than about 5 weight percent (wt. %). This includes embodiments in which the nanoparticles account for no greater than about 4 wt. %, no greater than about 3 wt. %, no greater than about 2 wt. % and no greater than about 1 wt. %. For example, in some embodiments the nanoparticle concentration is in the range from about 0.01 to about 5 wt. %; in the range from about 0.05 to about 4 wt. %; in the range from about 0.1 to about 2 wt. %; or in the range from about 0.1 to about 1 wt. %. The weight percentages recited here are based on the total weight of the metal alloy and the nanoparticles in the composite.

In some embodiments, the welding wires may include small amounts of other additives, such as titanium. Typically, such additives would be present in amounts of no greater than about 0.15 wt. %, based on the total weight of the welding wire. However, other embodiments of the welding wires consist essentially of, or consist of, only the metal alloy and the high temperature nanoparticles dispersed therein.

The metal alloy/nanoparticle composites of the welding wires can be made using known methods of dispersing particulate materials in metal alloys, including ultrasonic-assisted dispersion of nanoparticles in molten metals and mechanical alloying. The master nanocomposite approach described by Wang et al., Materials Science and Engineering: A, vol. 532, pp. 396-400 (2012) may be particularly well suited for producing metal alloy/nanoparticle composites with uniformly dispersed nanoparticles at low nanoparticle loadings.

The welding wires are dimensioned such that they can be used in welding applications and may be fabricated with standard welding wire gauge sizes. As such, they generally possess a narrow elongated form characterized by a length and a diameter, both of which are sized to render the wires suitable for use as welding wires. For the purposes of this disclosure the term "welding wire" refers to long, narrow wire-like structures of the type that are typically sold as coils wrapped around spools and also refers to shorter, typically linear, structures, which are sometimes referred to as welding rods or welding electrodes. Thus, in some embodiments, the welding wires are provided in the form of a narrow elongated wire having a nominal diameter in the range from 0.025 inches to 0.5 inches and a length of at least 10 feet. For example, the welding wires can have a nominal diameter selected from $1/32$, $1/16$, $1/8$, $1/4$, $3/8$ and $1/2$ inches. Such wires can have lengths of at least 10 feet, at least 20 feet, at least 100 feet or at least 1000 feet and may be spooled. In other embodiments the welding wires are provided in the form of a linear rod having a length of, for example, about 10 inches to about 2 feet. The rod may be tapered at one end to facilitate the welding of a joint. Such welding wires (or welding 'rods') can have standard arc welding electrode sizes, as determined by the American Welding Society. For example in some embodiments, the welding wires have a diameter in the range from 0.0625 to 0.313, corresponding to nominal diameters selected from $1/16$, $3/32$, $1/8$, $5/32$, $3/16$, $1/4$ and $5/16$ inches. The welding wires can be formed from the composite materials using known processing techniques including wire extrusion, drawing and/or casting techniques.

The welding wires can be used to weld joints in metal work pieces comprising metal alloys. One embodiment of a method of welding work pieces using the present welding wires comprises melting at least a portion of the metal alloy of the work pieces in the proximity of an interface between the work pieces; melting at least a portion of the welding wire in the proximity of the interface to form a molten weld pool comprising molten metal alloy from the work pieces and molten metal alloy from the welding wire; and allowing the molten weld pool to solidify, thereby forming a welded joint at the interface. Melting of the metals of the work pieces and the welding wire can be accomplished using elevated temperatures, elevated pressures, or both. The welding wires can be used in a variety of welding methods, including, but not limited to, arc welding, laser welding and torch welding. As used herein the term "work pieces" refers to two or more pieces of metal to be welding together, but can also refer to a single piece of metal having two or more separated segments (e.g., separated by a crack) to be welded together.

EXAMPLE

This example illustrates the fabrication and use of a welding wire comprising $Al_2O_3$ nanoparticles dispersed in an A206 alloy matrix. The composite material of the welding wire included 1 wt. % $Al_2O_3$ nanoparticles and was made by diluting a master nanocomposite comprising 5 wt. % $Al_2O_3$ nanoparticles dispersed in A206. The Al2O3 nanoparticles were spherical with a particle diameter of about 50 nm. The dilution was carried out according to the methodology described in Wang et al., Materials Science and Engineering: A, vol. 532, pp. 396-400 (2012).

Figure 2:
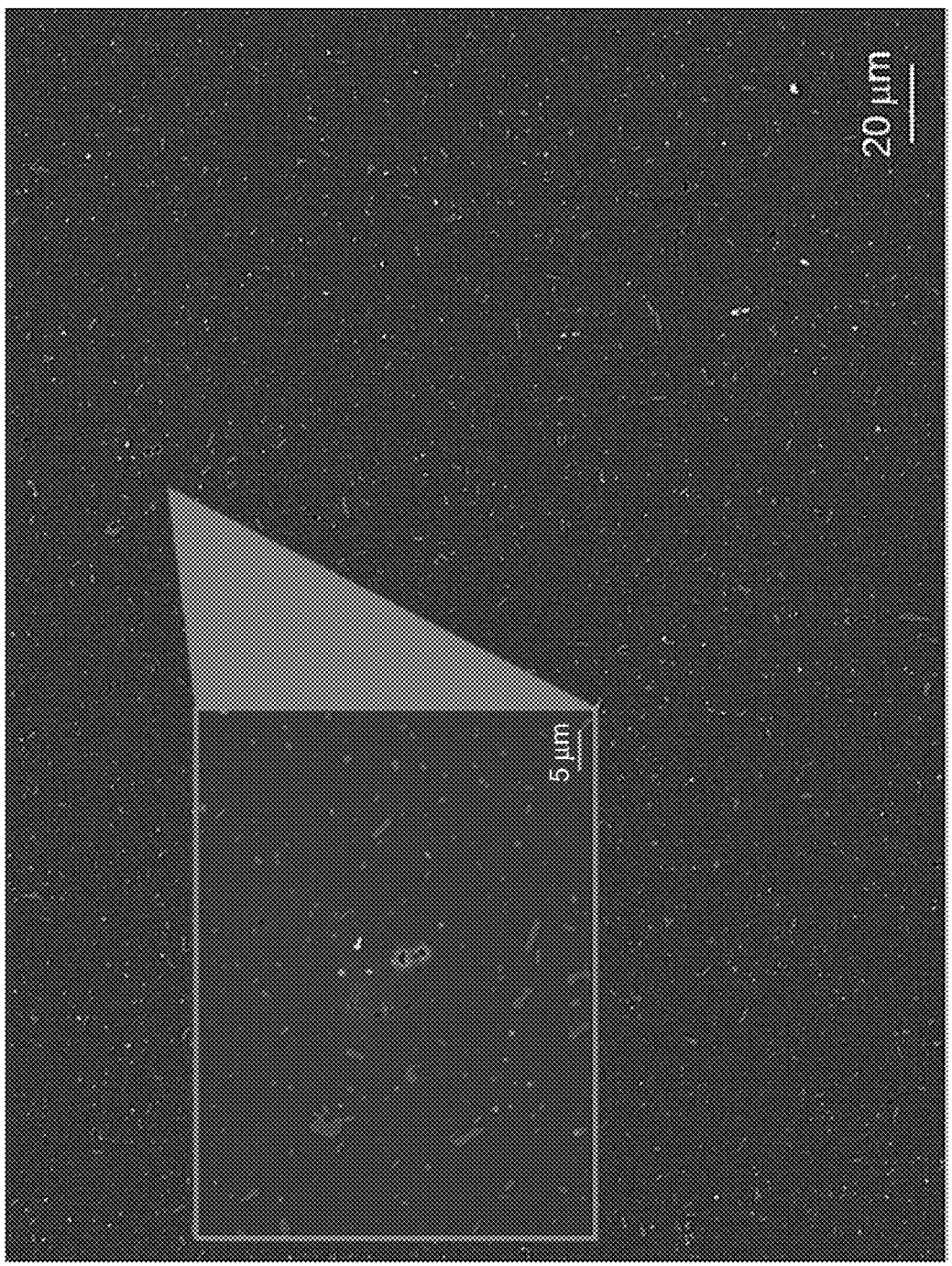
FIG. 2 is a scanning electron microscope image of the welding wire comprising of FIG. 2 taken along the transverse direction.

The composite material was extruded into a ⅛ inch diameter wire using an extrusion ratio of 120:1, an extrusion force of 75 ksi, an extrusion temperature of 427° C. and an extrusion rate of 60 in/min. Scanning electron microscope images of the extruded wire showing the dispersed nanoparticles are provided in FIG. 1 and FIG. 2 which show the material along the longitudinal (extruded) direction and the transverse direction, respectively.

A standard arc welding process is used to weld a joint between two A206 workpieces. The joint has fewer defects due to hot cracking than would a weld made from the same metal alloy in the absence of the high temperature nanoparticles.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of welding metal work pieces comprising metal alloys, the method comprising:
    melting at least a portion of the metal alloy of the work pieces in the proximity of an interface between the work pieces;
    melting at least a portion of a welding wire in the proximity of the interface, the welding wire comprising a metal alloy and a plurality of high temperature ceramic or high temperature intermetallic nanoparticles dispersed in the metal alloy, whereby a molten weld pool comprising molten metal alloy from the work pieces and molten metal alloy from the welding wire is formed; and
    allowing the molten weld pool to solidify, thereby forming a welded joint at the interface.

2. The method of claim 1, wherein the metal alloy of the work pieces and the metal alloy of the welding wire are the same metal alloy.

3. The method of claim 1, wherein the metal alloy of the work pieces is an aluminum alloy.

4. The method of claim 3, wherein the metal alloy of the work pieces is an Al—Cu alloy.

5. The method of claim 4, wherein the metal alloy of the welding wire is the same Al—Cu alloy.

6. The method of claim 3, wherein the metal alloy of the welding wire is an aluminum alloy having a different alloy composition from the aluminum alloy of the work pieces.

7. The method of claim 6, wherein the metal alloy of the welding wire and the metal alloy of the work pieces have different primary alloying elements.

8. The method of claim 7, wherein the metal alloy of the welding wire is an aluminum alloy having copper as it primary alloying element and the metal alloy of the work pieces is an aluminum alloy having zinc as its primary alloying element.

9. The method of claim 7, wherein the metal alloy of the welding wire is an aluminum alloy having zinc as its primary alloying element and the metal alloy of the work pieces is an aluminum alloy having copper as its primary alloying element.

10. The method of claim 7, wherein the metal alloy of either the welding wire or the work pieces is an A206 alloy and the metal alloy of the other of the welding wire or the work pieces is a 7075 alloy.

11. The method of claim 1, wherein the nanoparticle concentration in the welding wire is in the range from about 0.05 weight percent to about 5 weight percent, based on the total combined weight of the metal alloy and the nanoparticles in the welding wire.

12. The method of claim 1, wherein the nanoparticle concentration in the welding wire is in the range from about 0.1 weight percent to about 2 weight percent, based on the total combined weight of the metal alloy and the nanoparticles in the welding wire.

13. The method of claim 1, wherein the nanoparticles are ceramic nanoparticles.

14. The method of claim 13, wherein the nanoparticles comprise $Al_2O_3$ nanoparticles.

15. The method of claim 1, wherein the metal alloy of the work pieces is an aluminum alloy, the metal alloy of the welding wire is an aluminum alloy, the nanoparticles are ceramic nanoparticles and the concentration of nanoparticles in welding wire is in the range from about 0.05 to about 2 weight percent, based on the total combined weight of the metal alloy and the nanoparticles in the welding wire.

16. The method of claim 15, wherein the metal alloy of the work pieces and the metal alloy of the welding wire are both A206 alloys.

17. The method of claim 1, wherein the welding wire consists essentially of the metal alloy and the plurality of high temperature ceramic or high temperature intermetallic nanoparticles dispersed in the metal alloy.

18. A welding wire comprising a composite material comprising a metal alloy and a plurality of high temperature ceramic or high temperature intermetallic nanoparticles dispersed in the metal alloy, wherein the composite material is in an elongated form characterized by a length and a diameter, both of which are sized to render the elongated form suitable for use as a welding wire.

19. The welding wire of claim 18, wherein the elongated form has a nominal diameter in the range from 0.025 inches to 0.5 inches and a length of at least 10 feet.

20. The welding wire of claim 18, wherein the elongated form has a nominal diameter in the range from 0.125 inches to 0.375 inches and a length of at least 20 feet.

21. The welding wire of claim 20, wherein the metal alloy is an aluminum alloy, the nanoparticles are ceramic nanoparticles and the concentration of nanoparticles in the composite material is in the range from about 0.05 to about 2 weight percent, based on the total combined weight of the metal alloy and the nanoparticles.

22. The welding wire of claim 18, wherein the elongated form is tapered at one end, has a nominal diameter in the range from 0.065 inches to about 0.313 inches and a length in the range from about 10 inches to about 2 feet.

23. The welding wire of claim 18, wherein the metal alloy is an aluminum alloy, the nanoparticles are ceramic nanoparticles and the concentration of nanoparticles in composite material is in the range from about 0.05 to about 2 weight percent, based on the total combined weight of the metal alloy and the nanoparticles.

24. The welding wire of claim 23, wherein the alloy is an A206 alloy and the ceramic nanoparticles comprise $Al_2O_3$ nanoparticles.

* * * * *